United States Patent
Chieng et al.

(10) Patent No.: US 8,082,438 B2
(45) Date of Patent: Dec. 20, 2011

(54) SYSTEMS AND METHODS FOR BOOTING A CODEC PROCESSOR OVER A HIGH DEFINITION AUDIO BUS

(75) Inventors: Daniel L. Chieng, Austin, TX (US); Douglas D. Gephardt, Dripping Springs, TX (US); Jeffrey M. Klaas, Lakeway, TX (US); Adam Zaharias, Austin, TX (US)

(73) Assignee: D2Audio Corporation, Milpitas, CA (US)

( * ) Notice: Subject to any disclaimer, the term of this patent is extended or adjusted under 35 U.S.C. 154(b) by 665 days.

(21) Appl. No.: 12/202,359

(22) Filed: Sep. 1, 2008

(65) Prior Publication Data

US 2009/0063843 A1    Mar. 5, 2009

Related U.S. Application Data

(60) Provisional application No. 60/969,611, filed on Sep. 1, 2007.

(51) Int. Cl.
| | |
|---|---|
| G06F 9/00 | (2006.01) |
| G06F 1/04 | (2006.01) |
| G06F 3/00 | (2006.01) |
| G06F 13/00 | (2006.01) |
| G06F 15/00 | (2006.01) |
| G10L 19/00 | (2006.01) |
| G10L 21/04 | (2006.01) |
| H05K 7/10 | (2006.01) |

(52) U.S. Cl. ............... 713/2; 713/1; 713/375; 704/500; 704/503; 710/52; 710/104; 710/301; 712/32; 712/220

(58) Field of Classification Search .................. 713/2, 1, 713/375; 704/500, 503; 710/52, 104, 301; 712/32, 220
See application file for complete search history.

(56) References Cited

U.S. PATENT DOCUMENTS

| | | | |
|---|---|---|---|
| 6,012,142 A | | 1/2000 | Dokic |
| 6,016,075 A | * | 1/2000 | Hamo ............................. 330/10 |
| 6,205,223 B1 | | 3/2001 | Rao |

(Continued)

FOREIGN PATENT DOCUMENTS

EP    1 677 574 A    7/2006

OTHER PUBLICATIONS

Intel "High Definition Audio Specification" Rev. 1.0, Apr. 15, 2004, XP-002389409.*

(Continued)

*Primary Examiner* — Stefan Stoynov
(74) *Attorney, Agent, or Firm* — Fliesler Meyer LLP

(57) ABSTRACT

Systems and methods for booting a programmable processor such as a DSP that is incorporated into an HDA codec. The codec and a system memory containing boot program instructions are connected to an HDA bus. In a first mode, the DSP receives boot program instructions via the HDA bus and boots using these instructions. In a second mode, the DSP boots from instructions that are contained in a memory that is connected to the DSP. In one embodiment, the memory connected to the DSP is a component of a plug-in card, and the DSP is configured to determine whether the plug-in card is present, then boot from the memory on the plug-in card if it is present or boot from the system memory via the HDA bus if the plug-in card is not present.

17 Claims, 6 Drawing Sheets

U.S. PATENT DOCUMENTS

| | | | |
|---|---|---|---|
| 6,279,045 B1 * | 8/2001 | Muthujumaraswathy et al. | 710/5 |
| 6,301,366 B1 | 10/2001 | Malcolm et al. | |
| 6,427,181 B1 * | 7/2002 | Furuhashi | 710/300 |
| 6,748,515 B1 | 6/2004 | Hendrickson | |
| 6,920,553 B1 | 7/2005 | Poisner | |
| 7,425,992 B2 * | 9/2008 | Feeler et al. | 348/553 |
| 7,640,041 B2 | 12/2009 | Ragan | |
| 2002/0119803 A1 | 8/2002 | Bitterlich | |
| 2005/0160195 A1 | 7/2005 | Bruner et al. | |
| 2006/0247811 A1 | 11/2006 | Zaucha | |
| 2007/0005160 A1 | 1/2007 | Zaucha | |
| 2007/0067506 A1 * | 3/2007 | Cho | 710/22 |
| 2007/0239438 A1 | 10/2007 | Chuang | |
| 2009/0060228 A1 | 3/2009 | Chieng et al. | |

OTHER PUBLICATIONS

International Search Report dated Nov. 27, 2008 for Application No. PCT/US2008/074965.

INTEL, "High Definition Audio Specification," Revision 1.0, Apr. 15, 2004, XP002389409.

"4-Channel DAC and 6-Channel ADC High Definition Audio Codec, ALC262 Series Datasheet (Rev. 1.7)," Realtek Semiconductor Corp., Mar. 22, 2007, pp. i-64, http://www.realtek.cz/download/datsheets/alc262 v1.7.pdf.

"Low Power, Stereo CODEC w/Headphone & Speaker Amps," Cirrus Logic, Dec. 1, 2006, pp. 1-82, http://www.digchip.com/datasheets/download_datasheet.php?id=1104824&part-number=CS42L52.

"Overview of Audio Codec '97, revision 1.0," Intel Corporation, 1996, http://euc.jp/periphs/AC97_OVR.PDF, pp. 1-4.

International Search Report and Written Opinion dated Jan. 30, 2009 for Application No. PCT/US2008/074964, 13 pages.

International Search Report dated Nov. 25, 2008 for Application No. PCT/US2008/074963.

International Search Report and Written Opinion dated Jan. 30, 2009 for Application No. PCT/US2008/074966, 14 pages.

International Search Report and Written Opinion dated Jan. 30, 2009 for Application No. PCT/US2008/074967, 14 pages.

Kennedy, R., et al., "Tailor configurable processors for audio codecs," Electronic Engineering Times-Asia, Aug. 16, 2006, pp. 1-3.

Maxim Integrated Products, "Innovative Audio Cost-Reduction and Space-Saving Solutions Tune Out the Competition," 2006, pp. 1-23, XP002503538; http://newsletter.spezial.de/pdfdata/AUDIO_9.pdf> [retrieved on Nov. 11, 2008].

Princeton Technology Corp., "Stereo 2W Class-D Amplifier With Built-In Audio Processor," Jul. 2008, pp. 1-4, XP002503539; http://www.princeton.com/tw/> [retrieved on Nov. 11, 2008].

* cited by examiner

SYSTEMS AND METHODS FOR BOOTING A CODEC PROCESSOR OVER A HIGH DEFINITION AUDIO BUS

CROSS-REFERENCE TO RELATED APPLICATIONS

This application claims the benefit of U.S. Provisional Patent Application 60/969,611, filed Sep. 1, 2007, which is hereby incorporated by reference as if set forth herein in its entirety.

BACKGROUND

With the proliferation of PCs and advances in computer technologies, there has been a demand for PCs that have an increasing number of advanced features. Customers that purchase multimedia PCs and high-end gaming PCs in particular are demanding premium audio quality in order to achieve the ultimate audio/visual experience from their PCs. This demand has been addressed to some extent by the HDA specification introduced by Intel.

When Intel's 1997 Audio Codec standard (AC'97) was introduced, PC users typically listened to music and movies that only had stereo sound. As multi-channel audio formats such as Dolby Digital and DTS became more popular, users became accustomed to these audio formats and began to expect full surround, multi-speaker sound using these formats to be available in a PC environment. While AC'97 technology was initially adequate, it has not been able to keep pace with more recent advancements (e.g., newer audio and video encoding/decoding algorithms) that enable the PC to produce higher-quality audio.

Beginning with the introduction of Intel's High Definition Audio Specification Rev 1.0 in 2004, which is incorporated herein by reference, the HDA interface has been gradually gaining popularity in the PC space. The HDA architecture defined by the Intel specification attempts to meet the need for high quality audio in the PC space. This architecture defines the delivery of high fidelity audio content from a PC's memory to one or more audio codecs using an HDA controller that performs direct memory access (DMA) transfers of audio data over an HDA bus. The audio data delivered over the HDA bus is received, processed and output by the various components of the codecs (referred to in the HDA specification as "widgets").

While the HDA specification allows quite a bit of flexibility in the design of an HDA system for a PC, this flexibility is lost when the design is implemented. For instance, while an HDA system may have multiple codecs that perform different types of processing on audio data, these codecs are hardwired and their functionality cannot be changed.

BRIEF SUMMARY OF INVENTION

As described herein, various embodiments of the invention comprise systems and methods for booting processors such as digital signal processors (DSP's) that are incorporated into codecs in a personal computer's (PC's) High Definition Audio system, wherein boot program instructions are transferred to the processor via an High Definition Audio (HDA) bus.

In one embodiment, an HDA codec is configured to be coupled to an HDA bus. The codec includes a programmable processor such as a DSP that is configured to receive boot program instructions via an HDA bus and to boot using the instructions that were received from the HDA bus. In one embodiment, the codec is configured to be coupled to a separable non-volatile memory such as an EEPROM on a plug-in card. The DSP is configured in this case to determine whether the plug-in card and the corresponding memory are connected the PC's motherboard and thereby to the DSP. If the plug-in card is present, the DSP boots from the boot program instructions on the card's memory. If the plug-in card is not present, the DSP boots from the boot program instructions received from the system memory via the HDA bus.

BRIEF DESCRIPTION OF THE DRAWINGS

Other objects and advantages of the invention may become apparent upon reading the following detailed description and upon reference to the accompanying drawings.

Figure 1:
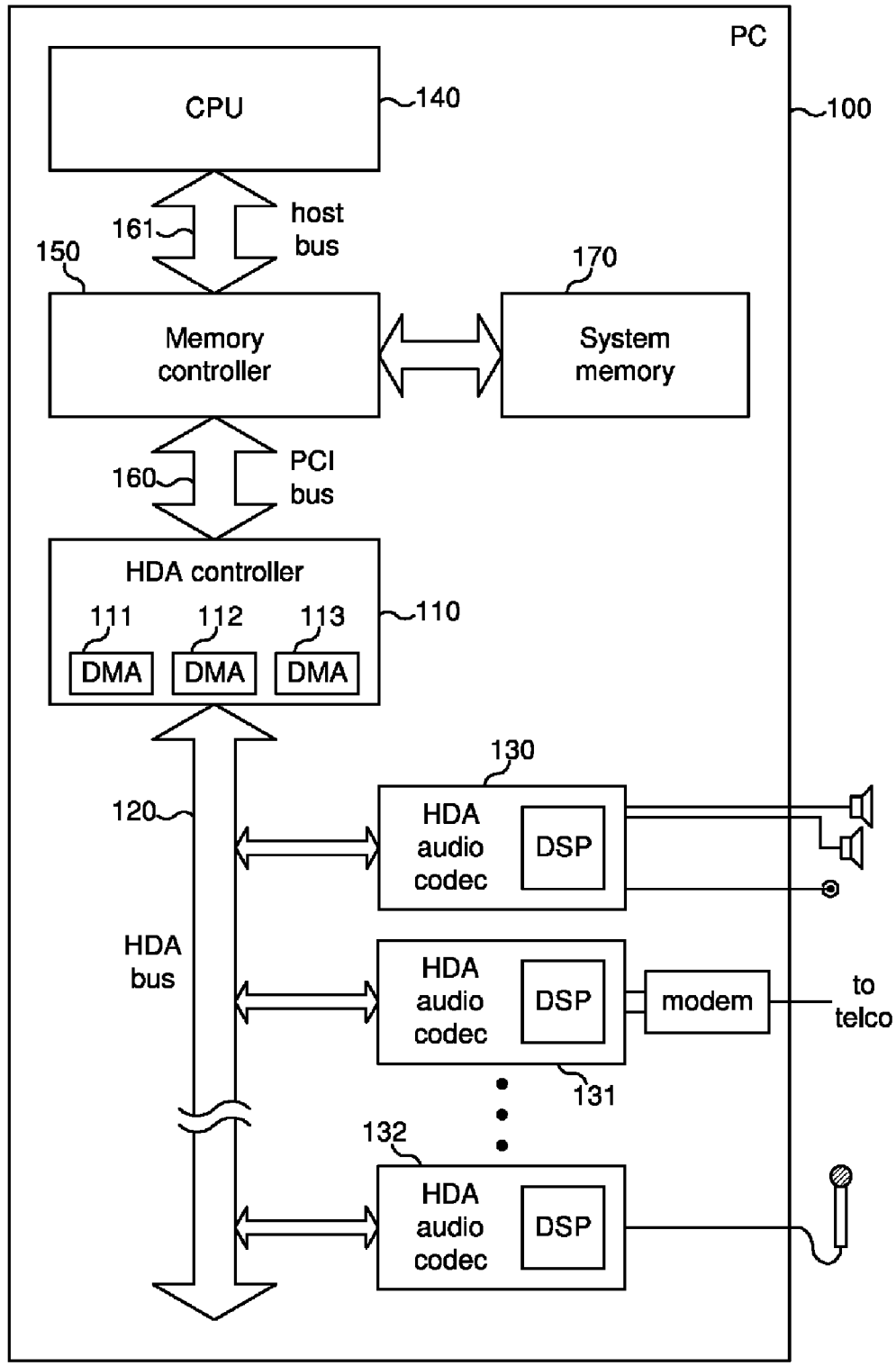
FIG. 1 is a functional block diagram illustrating the hardware structure of a system having an High Definition Audio (HDA) architecture that incorporates DSP-based codecs in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for booting processors such as digital signal processors (DSP's) that are incorporated into codecs in a personal computer's (PC's) High Definition Audio system, wherein boot program instructions are transferred to the processor via an High Definition Audio (HDA) bus.

In one embodiment, an HDA codec is configured to be coupled to an HDA bus. The codec includes a programmable processor such as a DSP that is configured to receive boot program instructions via an HDA bus and to boot using the instructions that were received from the HDA bus. In one embodiment, the codec is configured to be coupled to a separable non-volatile memory such as an EEPROM on a plug-in card. The DSP is configured in this case to determine whether the plug-in card and the corresponding memory are connected the PC's motherboard and thereby to the DSP. If the plug-in card is present, the DSP boots from the boot program instructions on the card's memory. If the plug-in card is not present, the DSP boots from the boot program instructions received from the system memory via the HDA bus.

PC-Based Audio

With the proliferation of PCs and advances in computer technologies, there has been a demand for PCs that have an increasing number of advanced features. Customers that purchase multimedia PCs and high-end gaming PCs in particular are demanding premium audio quality in order to achieve the ultimate audio/visual experience from their PCs. This demand has been addressed to some extent by the HDA specification introduced by Intel.

When Intel's 1997 Audio Codec standard (AC'97) was introduced, PC users typically listened to music and movies that only had stereo sound. As multi-channel audio formats such as Dolby Digital and DTS became more popular, users became accustomed to these audio formats and began to expect full surround, multi-speaker sound using these formats to be available in a PC environment. While AC'97 technology was initially adequate, it has not been able to keep pace with more recent advancements (e.g., newer audio and video encoding/decoding algorithms) that enable the PC to produce higher-quality audio.

Beginning with the introduction of Intel's High Definition Audio Specification Rev 1.0 in 2004, which is incorporated herein by reference, the HDA interface has been gradually gaining popularity in the PC space. The HDA architecture defined by the Intel specification attempts to meet the need for high quality audio in the PC space. This architecture defines the delivery of high fidelity audio content from a PC's memory to one or more audio codecs using an HDA controller that performs direct memory access (DMA) transfers of audio data over an HDA bus. The audio data delivered over the HDA bus is received, processed and output by the various components of the codecs (referred to in the HDA specification as "widgets").

While the HDA specification allows quite a bit of flexibility in the design of an HDA system for a PC, this flexibility is lost when the design is implemented. For instance, while an HDA system may have multiple codecs that perform different types of processing on audio data, these codecs are hardwired and their functionality cannot be changed. It would be desirable to provide systems and methods that maintain the flexibility of the HDA system, including enabling changes to the functionality of the system after it is implemented.

This flexibility is provided in one system by providing an HDA codec that incorporates a DSP. The DSP is programmable so that the functionality of the codec can be modified by changing the programming of the DSP. This programming is at least partially installed on the DSP when the system is powered up and the DSP is booted. In the present system, the boot program can be transferred to the DSP over the HDA bus rather than being retrieved from a non-volatile memory that is local to the DSP. In one embodiment, the boot program instructions can either be provided to the DSP over the HDA bus, or from a plug-in card that is coupled to the codec through a connector other than the HDA bus. In still another embodiment, boot program instructions can be transferred to the DSP over the HDA bus, and the DSP can load these instructions into a local non-volatile memory so that the DSP can thereafter boot from the program in the local memory.

High Definition Audio (HDA)

With the introduction of Intel's High Definition Audio Specification Rev 1.0 in 2004, the HDA interface has been gradually gaining popularity in the PC space. Users of multimedia PCs and high-end gaming PCs in particular are demanding premium audio quality in order to achieve the ultimate audio/visual experience from their PCs. The HDA architecture bridges the gap in delivering high fidelity audio content from the memory system of the PC to the audio codecs of the HDA system.

The primary goal of the HDA specification is to describe an infrastructure within a PC environment which is designed to support high quality audio. This infrastructure provides a mechanism for transferring audio data directly from the PC's memory system to one or more audio codecs via an HDA bus. The codecs typically convert the digital audio data received from the memory to analog signals and process these signals to output signals that can be provided as, for instance, a line output, a modem output, or an output to an amplifier.

Referring to FIG. 1, a functional block diagram illustrating the hardware structure of a system having an HDA architecture that incorporates DSP-based codecs is shown. As depicted in this figure, the HDA architecture in a PC 100 includes an HDA controller 110, an HDA bus 120 and several codecs 130-132. (While FIG. 1 includes three codecs, there may be more or fewer codecs in a given embodiment.) These components are constructed on the motherboard of the PC, along with CPU 140 and memory controller 150.

HDA controller 110 is coupled to memory controller 150 via a bus (160) such as a PCI bus or other type of system bus. Memory controller 150 is coupled to CPU 140 by a host bus 161. Memory controller 150 is also coupled to the system memory 170. Codecs 130-132 may be connected to one or more converters in order to convert the audio data processed by the codecs to a suitable output format, or to convert input data received by the codecs to appropriate formats for use by the codecs. The audio processing of the codecs is performed by a combination of conventional widgets and a programmable processor such as a DSP. The output signals produced by the converters may be provided to a variety of output devices such as amplifiers, speakers or headphones.

HDA controller 110 acts as a bus mastering input/output (I/O) device on the PCI bus. HDA controller 110 includes multiple DMA engines 111-113. (Although three DMA engines are depicted in the figure, there may be more or fewer in a given embodiment.) DMA engines 111-113 control the transfer of data between system memory 170 (via memory controller 150 and bus 160) and the various HDA codecs 130-132. The DMA engines can transfer data from the codecs to the system memory, as well as transferring data from the system memory to the codecs.

HDA bus 120 is configured to support serial data transfers between HDA controller 110 and codecs 130-132. HDA bus 120 is also used to distribute a 24 Mhz bit line clock from HDA controller 110 to codecs 130-132. This bit line clock is used by the controller and the codecs to enable the transfer of data over the HDA bus. The codecs use the bit line clock to extract time-multiplexed, serialized data from the HDA bus.

Typically, each of codecs 130-132 will extract a stream of digital data from the time-multiplexed data on HDA bus 120. This digital data will be converted to an analog signal and processed by the codec. The processing may include performing a variety of functions, such as volume control, muting, mixing, and the like. As noted above, the processed data may be provided to a converter which can convert the processed signal if necessary to produce an output signal (e.g., the converter may convert the analog signal into a digital output signal). In addition to processing audio data, codecs 130-132 may provide control data to HDA controller 110 via HDA bus 120. The codecs may also receive input signals (e.g., an analog input signal from a microphone), process the signals, and provide these signals to the HDA controller via the HDA bus.

Data is transferred between system memory 170 and codecs 130-132 in "streams." In the HDA specification, a stream is a logical connection between one of the codecs and a buffer in the system memory. Each stream is driven by a corresponding one of the DMA engines in the HDA controller. The DMA engine can only drive a single stream, so if the system has more streams than DMA engines, one or more of the streams must remain inactive until DMA engines become available to drive them. A stream may be either an input stream or an output stream, but not both. Output streams are considered broadcast streams, and may be received by more than one of the codecs. Input streams, the other hand, are associated with only a single one of the codecs.

As noted above, the streams are conveyed over the HDA bus as time-multiplexed data. The HDA bus transmits data in successive frames. The frame rate is 48 kHz, so each frame is 20.83 microseconds long. The frame can be broken down into fields, including a field for command and/or response data, as well as sample fields for each of the one or more streams. The frame may also include null space if less than the maximum number of streams is being transmitted. Within each sample in a stream of data, there are typically fields for data corresponding to two channels (e.g., left and right stereo channels). It should be noted, however, that more channels (e.g., left, right, left rear and right rear) can be transmitted. Also, multiple sample fields can be used to convey data for a single channel that has a data rate greater than the 48 kHz frame rate.

The HDA specification is intended to define an architecture in which codecs have a modular construction. The codecs make use of parameterized building blocks (widgets) to form a codec that is discoverable and configurable. The widgets, and collections of widgets, are uniquely addressable nodes in the HDA architecture. As a result, a software driver can identify and control the various operations of the codecs.

The widgets that form an HDA codec are interconnected to form function groups within the codecs. A codec can contain more than one function group. A codec may, for example, contain several audio function groups that process audio data for different audio channels. Widgets that are commonly used in these audio function groups include audio output converter widgets, audio input converter widgets, I/O (pin) widgets, mixer widgets, selector (mux) widgets, power state widgets, and volume widgets.

HDA Codec Having an Integral Processor

Conventionally, the widgets in a codec are hardwired together. A particular codec may be designed to perform a number of functions, but these functions are performed by widgets that have fixed functions, so the functions of the codec are also fixed once its design has been established and the codec constructed. The present codec, on the other hand, incorporates a programmable processor such as a DSP.

Figure 2:
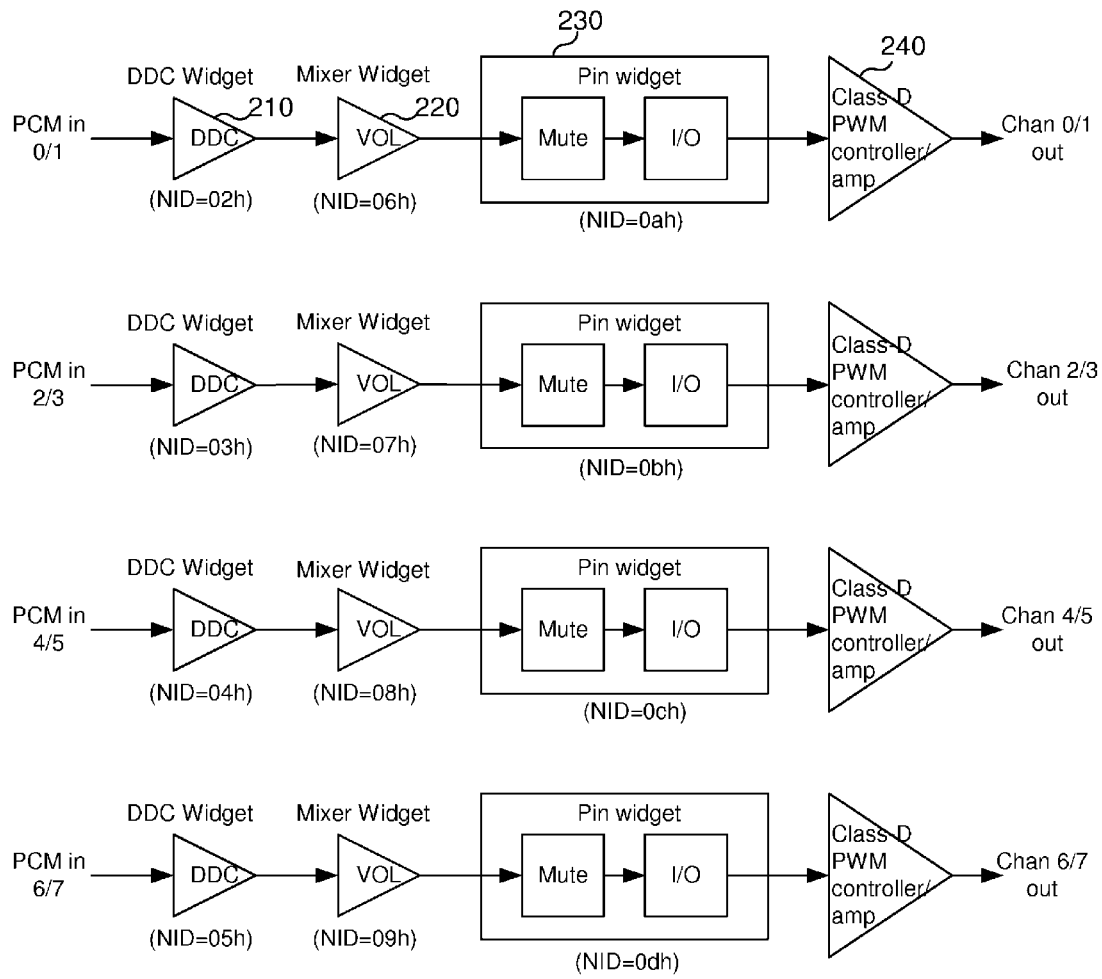
FIG. 2 is a diagram illustrating the interconnection of widgets in an exemplary HDA codec with an integrated pulse width modulation (PWM) controller/amplifier in accordance with one embodiment.

The DSP provides the capability to perform intelligent processing of audio data. In one embodiment, the DSP is programmed to function as a Class-D PWM controller that is integrated into an HDA codec. Referring to FIG. 2, a diagram illustrating the interconnection of widgets in an exemplary HDA codec with an integrated PWM controller/amplifier is shown. In this example, the codec is configured to process eight channels (four stereo pairs) of audio data. Each stereo pair is converted from an input digital format to an internal digital format by a DDC widget (e.g., 210). Because the stream(s) of data on the HDA bus are time-multiplexed, the DDC widget pulls the appropriate packets of audio data from the bus and formats the data into a digital stream (e.g., an I2S data stream) that can be processed in the codec. (In this embodiment, the codec processes the signal in a digital, rather than analog, form.) The digital signal is then processed by a mixer widget (e.g., 220), which may sum the signal with other signals or control the volume of the signal, and a pin widget (e.g., 230), which can mute the signal and output the signal to a PWM controller/amplifier (e.g., 240).

It should be noted that the mixer widget and pin widget may be virtual (or logical) components of the codec. While the DDC widget is a hardware component that is necessary to pull data off the HDA bus, the mixer and pin widgets usually perform functions that can be provided by the DSP. Consequently, the mixer and pin widgets may be present as hardware (which need not be used) or the DSP may simply represent these widgets logically, so that commands addressed to these widgets are forwarded to the DSP, where they are processed in the same manner as if the widgets had been physically present. For instance, where the mixer widget would normally control the volume of the audio signal processed by the codec, the DSP can control the volume as a function of the PWM controller. Similarly, where the pin widget would normally control muting and input/output functions, these functions can be implemented in the PWM controller.

An all digital Class-D PWM controller is superior to its analog counter-part because of the inclusion of a DSP. The DSP allows customization of audio sound such as parametric equalization, psycho-acoustic effects, room equalization, virtual surround sound, bass boost, mixing, custom filters, and so on. These features are usually accessible through dedicated control ports such as I2C, SPI, or USB, which in a typical standalone system are cost effective ways to communicate with the DSP. In a PC system, however, cost pressure is high and eliminating a dedicated hardware connection is valuable because of the resulting cost reduction.

Booting the Codec's Processor

Because the DSP is a programmable device, it must boot when it is powered up. Typically, a processor such as a DSP is booted by retrieving a program from a non-volatile memory such as an EEPROM that is connected to the processor specifically for this purpose. The memory may, for example, be connected to the processor via an I2C or SPI link. Programming this memory with a program is usually accomplished by sending commands over a USB link to a microcontroller that controls the reset and boot lines of the DSP.

In the present system, it is desirable to eliminate the need for a dedicated boot memory, and thereby eliminate the cost and space needed for this memory. The present system is therefore configured to receive the boot program instructions via the HDA bus. These instructions can be stored in an existing memory and transferred to the codec's DSP over the HDA bus, thereby eliminating the need for a dedicated DSP boot memory. The present system can also be configured to determine whether an optionally connected boot memory is connected to the processor and then boot from this memory if present or from the HDA bus if the optional memory is not present. Alternatively, the system can be configured to boot from the HDA bus, then load instructions received over the HDA bus into a local memory and reboot from the instructions loaded into the local memory.

The HDA interface exposes a set of GPIO pin widgets that are one byte wide that can be read or written. A general purpose input output (GPIO) register is used to store the status of incoming and outgoing data, as well as the reset states of the DSP logic. There are two different resets available in the GPIO register. One is the boot-over-HDA reset that causes the DSP boot loader to look for the program to come from the HDA link. The other reset is the boot-normal reset that causes the DSP boot loader to look for the program to come from the HDA bus or elsewhere, depending on what the boot mode pins are set to. The general purpose input (GPI) register is used to store words that came from the HDA link, and the general purpose output (GPO) register is used to store words that are sent over the link.

Figure 3:
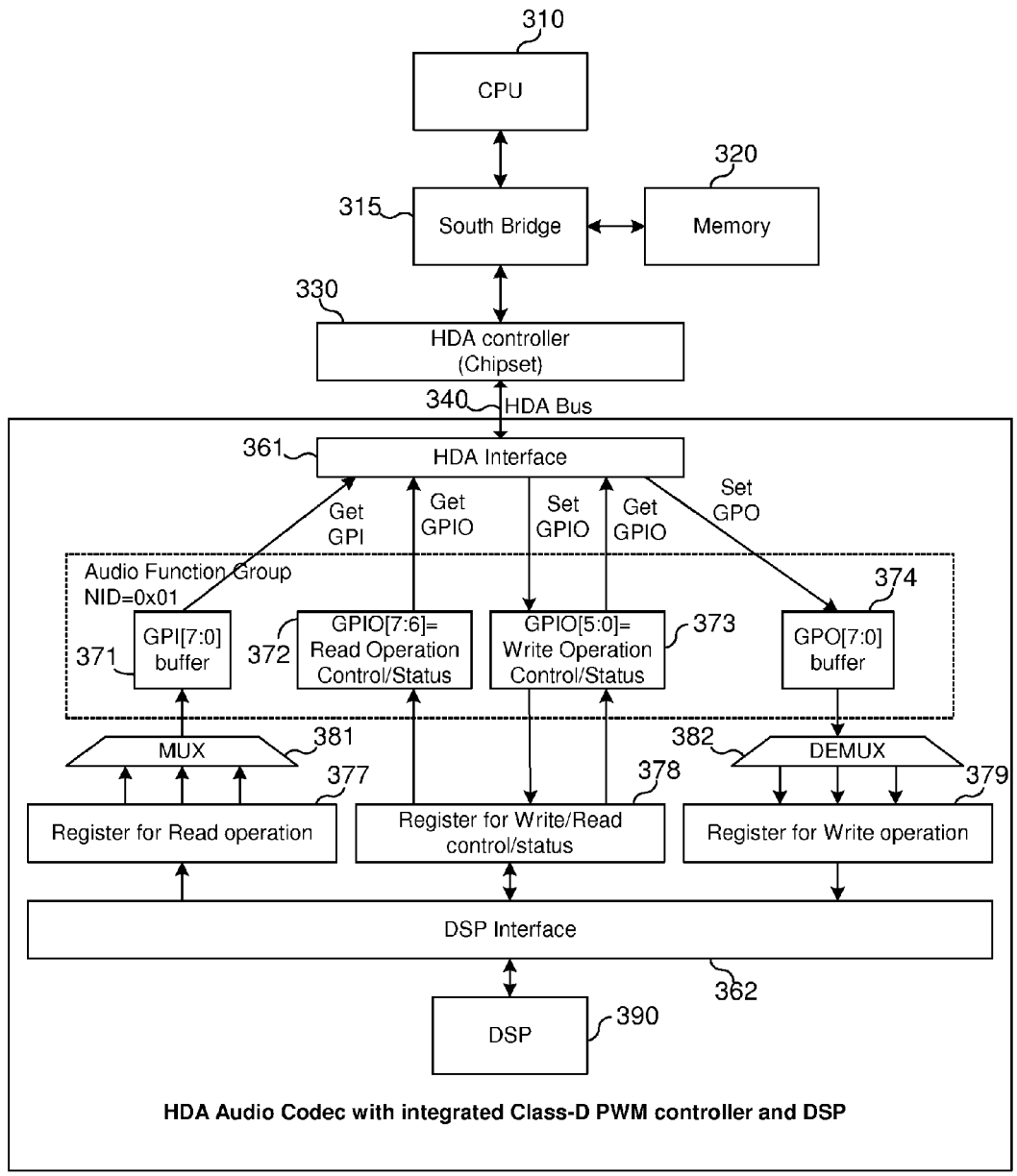
FIG. 3 is a diagram illustrating the communication link between a memory and a DSP using the HDA bus in a personal computer (PC) in accordance with one embodiment.

Referring to FIG. 3, a diagram illustrating the communication link between the memory and the DSP using the HDA bus in a PC is shown. In this embodiment, CPU 310 and memory 320 are connected to South Bridge 315, which is in turn connected to HDA controller 330. HDA controller 330 and HDA codec 350 are both connected to HDA bus 340. Codec 350 has an HDA interface 361 which is connected to HDA bus 340. Registers GPI (371), GPIO (372-373) and GPO (374) are connected to HDA interface 361 and are configured to store I/O data that is transferred over HDA bus 340. (Read and write portions of the GPIO register are shown as separate blocks 372 and 373 in the figure.) Multiplexer 381 is connected to GPI register 371 and serves to select one of three bytes stored in DSP read register 377 to store in GPI register 371. Multiplexer 382 is connected to GPO register 374 and serves to store the byte of data from GPO register 374 in a selected one of the three byte locations in DSP write register 379. DSP control/status register 378 is connected to GPIO register 372-373. DSP interface 362 couples DSP 390 to registers 377-379.

In this embodiment, the DSP's memory space is three bytes wide. The HDA link, on the other hand, is one byte wide. To overcome the difference in word alignment, the DSP uses a counter to keep track of which byte was sent or received across the HDA bus. The status of which byte is being sent/received on the bus is available in the GPIO register. The HDA bus sees the widget as only a byte-wide register. On the DSP side, the DSP sees the widget as a three-byte register that has a status value in the GPIO register indicating which byte is being conveyed on the HDA bus.

Figure 4:
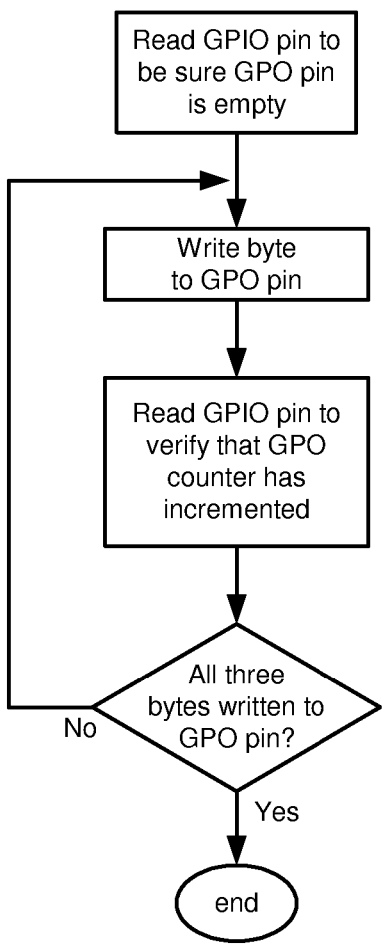
FIG. 4 is a flow diagram illustrating a procedure that is used to write data to the GPI register in the HDA system of one embodiment.

Because of the width difference between the HDA bus and the program words, the following procedure is used to write to the GPI register. The procedure is illustrated in FIG. 4. First, the GPIO pin is read to make sure that the GPI pin is empty. Then, the high byte is written to the GPI pin. The GPIO pin is then read to verify that the GPI counter has incremented. These steps are repeated for the middle and lower byte respectively. These steps write a three-byte word onto the HDA bus—the steps are repeated for each three-byte word that is written to the bus.

Figure 5:
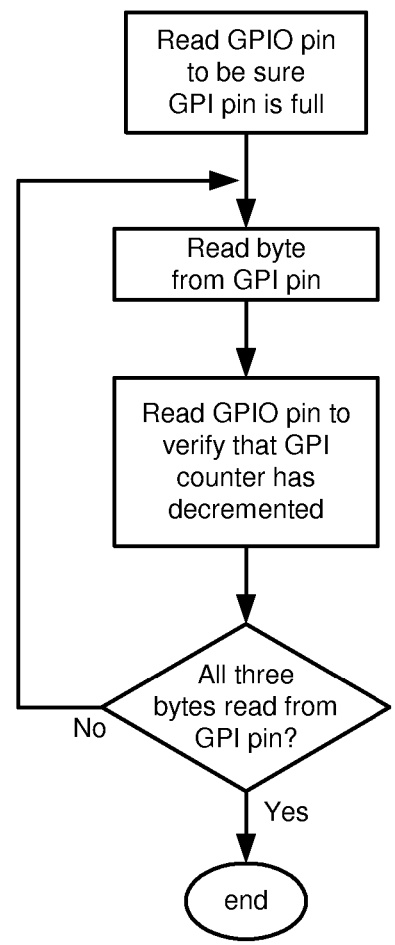
FIG. 5 is a flow diagram illustrating a procedure that is used to read data from the GPO register in the HDA system of one embodiment.

A similar procedure is used to read data from the GPO register, as illustrated in FIG. 5. First, the GPIO pin is read to make sure that the GPI pin is empty. Then, the high byte is written to the GPI pin. The GPIO pin is then read to verify that the GPI counter has incremented. These steps are repeated for the middle and lower byte respectively. These steps write a three-byte word onto the HDA bus—the steps are repeated for each three-byte word that is written to the bus.

Figure 6:
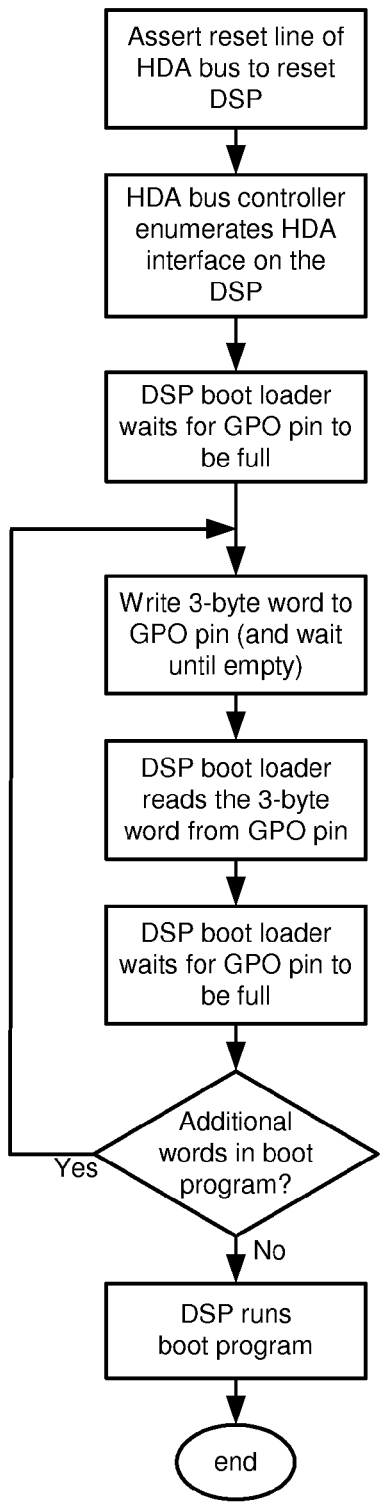
FIG. 6 is a flow diagram illustrating a procedure for transferring three-byte words of a boot program from an HDA bus to the DSP of an HDA codec in accordance with one embodiment.

These procedures for transferring three-byte words between the HDA bus and the DSP can be used to transfer boot instructions from the HDA bus to the DSP as shown in FIG. 6. This procedure assumes the boot pins of the DSP are set to load from the HDA bus. Referring to FIG. 6, the reset line of the HDA bus is asserted (logic high in this embodiment), which resets the DSP. The HDA bus controller then enumerates the HDA interface on the DSP. After the reset line is asserted, the DSP boot loader waits for the GPO pin to be full. The three bytes of a boot program instruction are written to the GPO pin (which will not receive another byte until it is empty). The DSP boot loader then reads the three-byte word from the GPO pin. The GPO pin is then empty, so another three-byte word of the boot program is written to the GPO pin. Successive words of the program are transferred in this manner until the entire program is sent over the HDA bus. After the last word of the boot program is transferred, the DSP runs the boot program. It should be noted that the DSP program loaded over the HDA bus includes some overhead data to inform the boot loader of the location of the program in memory, the number of bytes in the program, and the checksum of the program.

As noted above, the procedure of FIG. 6 is carried out if the boot pins of the DSP are set to load from the HDA bus. In one embodiment, the DSP can be configured to load the boot program alternately from the HDA bus or from a memory that is more directly connected to the DSP. The DSP may be configured to select one of these boot modes (booting from the HDA bus or booting from the DSP-connected memory) either manually or automatically. The manual selection of one of the boot modes may be accomplished by setting the boot pins of the DSP to indicate which of the modes should be used to boot the device. Automatic selection can be accomplished, for example, by having the DSP boot from the connected memory if it is present and booting from the HDA bus if the memory is disconnected.

In one embodiment, the HDA system including the DSP-based codec is constructed on the motherboard of a PC. The motherboard also includes a connector that enables connection of a second, separable component such as a plug-in card to the motherboard. (As used herein, "separable" means that the second component can be disconnected or separated from the motherboard.) This second component includes a non-volatile memory that stores the boot program. When the second component is connected to the motherboard, the DSP can boot from the memory on the second component in the same way a conventional DSP would boot from a local non-volatile memory. When the second component is not connected to the motherboard, the DSP boots from the HDA bus as described above.

Figure 7:
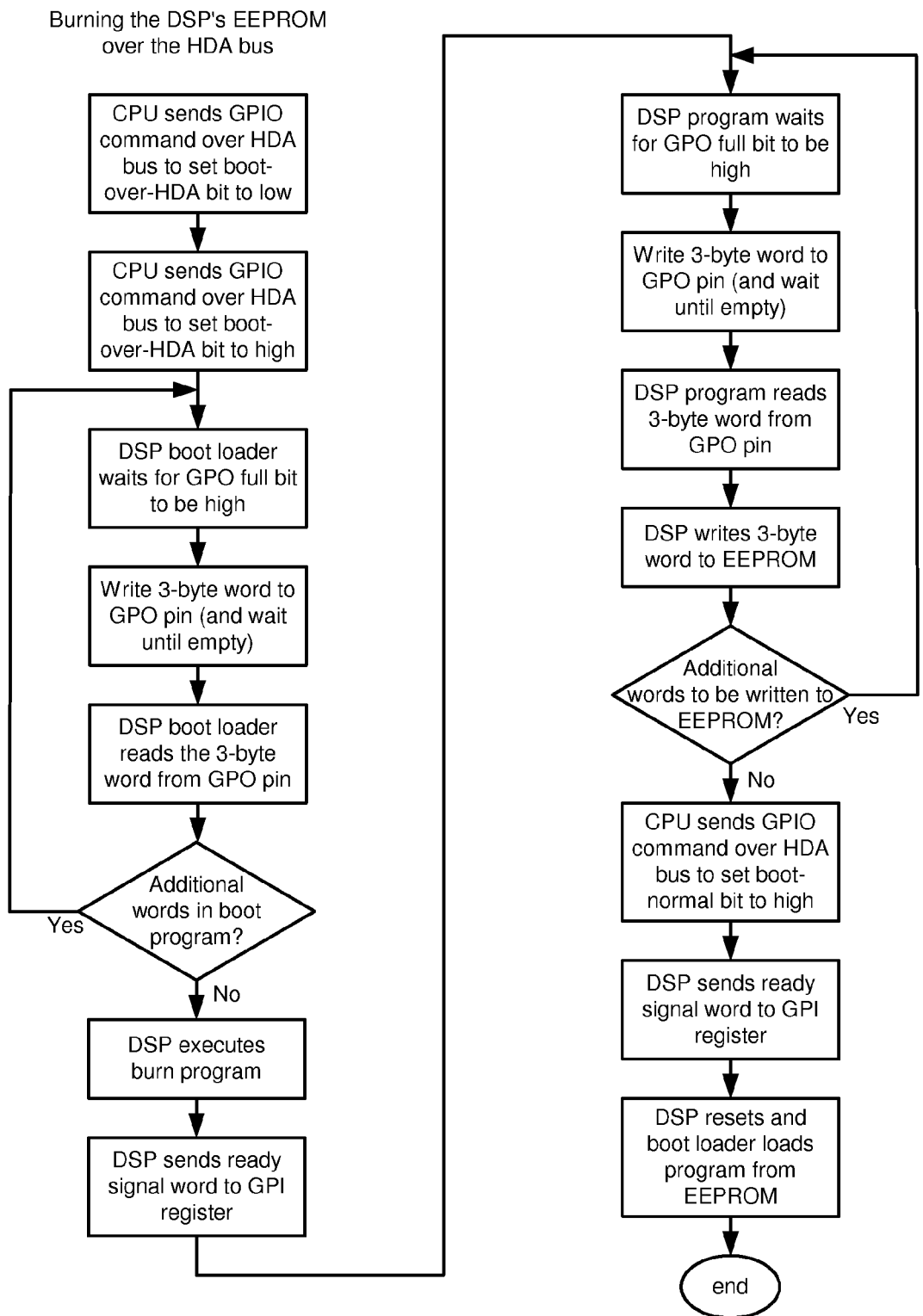
FIG. 7 is a flow diagram illustrating a procedure for transferring three-byte words of a boot program from an HDA bus to the DSP of an HDA codec and then to a non-volatile memory in accordance with one embodiment.

In addition to booting from the HDA bus or from the memory of a second, separable component, the DSP may be configured to receive a boot program via the HDA bus, load this program into a local non-volatile memory such as an EEPROM, and then reboot from the program stored on the EEPROM. This procedure is illustrated in FIG. 7. It should be noted that that in conventional systems, it was typically necessary to send commands to a microcontroller that would change the interface from which the DSP boots and then reset the DSP to boot from the new interface. The procedure of FIG. 7 eliminates the need for the microcontroller and thereby reduces the system cost.

Referring to FIG. 7, a GPIO command is sent over HDA to set a boot-over-HDA bit to low. Another GPIO command is then sent to assert the boot-over-HDA bit to high. This places the DSP in a reset state, except for the HDA interface. The DSP boot loader then waits for the GPI full bit to be set to high. When the GPI full bit is high, the DSP boot loader fetches the three-byte word out of the GPO register. This is repeated for each successive three-byte word in the program. Once all the words in the program are received, the DSP executes the received code. The DSP then sends a ready signal word to the GPI register. The DSP program checks the GPIO register to see when the GPO register is full. When the GPI register is full, the DSP program writes the received word to the local non-volatile memory. This is repeated until the whole program image is loaded into the local memory. A GPIO command is then sent over HDA to sets the boot-normal bit to high. The DSP then resets and the boot loader loads the program from the local non-volatile memory.

It should be noted that the terms "PC" and "personal computer" are used herein to refer to a wide range of computing systems that are commonly purchased and used by individual consumers. These systems may include desktop computers, laptop computers, tablet computers and the like, and may be used in home, office, mobile or other environments. It should also be noted that, although the embodiments described above focus on codecs that incorporate DSP's, other embodiments may use types of processors other than DSP's (such as general purpose processors, programmable microcontrollers, etc.). to achieve the programmability, configurability and other advantages that are obtained through the use of a processor in the HDA codec.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A personal computing system comprising:
a CPU;
a system memory system coupled to the CPU;
a High Definition Audio (HDA) controller coupled to the system memory;
an HDA bus coupled to the HDA controller; and
a codec coupled to the HDA bus, wherein the codec includes
a programmable processor;
a set of HDA general purpose (GP) registers configured to temporarily store data that is communicated between the HDA bus and the codec; and
a further set of registers accessible by the programmable processor, coupled to the HDA GP registers, and configured to temporarily store data that is communicated between the HDA bus and the codec;
wherein the programmable processor within the codec is configured to boot in at least a first mode from boot program instructions that are stored in the system memory and are transferred by the HDA controller over the HDA bus to the codec:
wherein the HDA GP registers and the processor-accessible registers within the codec temporarily store the boot program instructions during transfer of the boot program instruction to the codec; and
wherein the HDA GP registers and the processor-accessible registers within the codec also communicate status and control information associated with data including the boot program instructions, that is communicated between the HDA bus and the codec.

2. The personal computing system of claim 1, further comprising a connector configured to connect a separable component having a non-volatile memory to the programmable processor, wherein the programmable processor is configured to boot in either the first mode or in a second mode, wherein in the second mode, the programmable processor is configured to boot from boot program instructions that are stored in the non-volatile memory of the separable component.

3. The personal computing system of claim 2, further comprising the separable component, wherein the separable component comprises a plug-in card coupled via the connector to the codec.

4. The personal computing system of claim 2, wherein the programmable processor is configured to determine whether the separable component is coupled to the codec, to boot in the second mode when the separable component is coupled to the codec, and to boot in the first mode when the separable component is not coupled to the codec.

5. The personal computing system of claim 1, wherein the programmable processor is configured as a Class-D PWM controller.

6. The personal computing system of claim 1, wherein each of the HDA GP registers is no more than one byte wide, and wherein the set of processor-accessible registers is at least two bytes wide.

7. A personal computing system comprising:
a CPU;
a system memory system coupled to the CPU;
a High Definition Audio (HDA) controller to the system memory;
an HDA bus coupled to the HDA controller; and
a codec coupled to the HDA bus;
wherein the codec includes a programmable processor within the codec that is configured to boot in at least a first mode from boot program instructions that are stored in the system memory and are transferred by the HDA controller over the HDA bus to the codec;
wherein the codec includes a non-volatile memory coupled to the programmable processor; and
wherein the codec is configured to receive boot program instructions from the HDA bus, store the boot program instructions in the non-volatile memory coupled to the programmable processor, and reboot the programmable processor from the boot program instructions stored in the non-volatile memory coupled to the programmable processor.

8. A device comprising:
a codec configured to be coupled to a High Definition Audio (HDA) bus;
wherein the codec includes
a programmable processor;
a set of HDA general purpose (GP) registers configured to temporarily store data that is communicated between the HDA bus and the codec; and
a further set of registers accessible by the programmable processor, coupled to the HDA GP register, and configured to temporarily store data that is communicated between the HDA bus and the codec;
wherein the programmable processor within the codec is configured to boot in at least a first mode from boot program instructions that are received by the codec from the HDA bus;

wherein the HDA GP registers and the processor-accessible registers within the codec temporarily store the boot program instructions during transfer of the boot program instructions to the codec; and wherein the HDA GP registers and the processor-accessible registers within the codec also communicate status and control information associated with data, including the boot program instructions, that is communicated between the HDA bus and the codec.

9. The device of claim 8, wherein the programmable processor is configured to be coupled to a separable non-volatile memory, wherein the programmable processor is configured to boot in either the first mode or in a second mode, wherein in the second mode, the programmable processor is configured to boot from boot program instructions that are stored in the separable non-volatile memory.

10. The device of claim 9, wherein the programmable processor is configured to determine whether the separable non-volatile memory is coupled to the programmable processor, to boot in the second mode when the separable non-volatile memory is coupled to the programmable processor, and to boot in the first mode when the separable non-volatile memory is not coupled to the programmable processor.

11. The device of claim 8, wherein the programmable processor is configured as a Class-D PWM controller.

12. The device of claim 8, wherein each of the HDA GP registers is no more than one byte wide, and wherein the set of processor-accessible registers is at least two bytes wide.

13. A device comprising:
a codec configured to be coupled to a High Definition Audio (HDA) bus;
wherein the codec includes a programmable processor that is configured to boot in at least a first mode using boot program instructions that are received by the codec from the HDA bus;
wherein the codec includes a non-volatile memory coupled to the programmable processor; and
wherein the codec is configured to receive boot program instructions from the HDA bus, store the boot program instructions in the non-volatile memory coupled to the programmable processor, and reboot the programmable processor from the boot program instructions stored in the non-volatile memory coupled to the programmable processor.

14. A method for booting a programmable processor in a High Definition Audio (HDA) codec, the method comprising:
in a first mode,
retrieving boot program instructions from a memory;
transferring the boot program instructions from the memory to the codec via an HDA bus which is coupled between the memory and the codec; and
booting a programmable processor in the codec using the boot program instructions;
wherein each of the boot program instructions comprises a multiple-byte word, and wherein transferring the boot program instructions from the HDA bus to the codec comprises transferring each be of each multiple-byte word in a separate HDA frame.

15. The method of claim 14, further comprising, prior to retrieving the boot program instructions from the memory, determining whether a separable non-volatile memory is coupled to the codec, booting in the first mode when the separable non-volatile memory is not coupled to the codec, and booting in a second mode when the separable non-volatile memory is coupled to the codec, wherein in the second mode the programmable processor boots from boot program instructions that are stored in the separable non-volatile memory.

16. The method of claim 14, wherein the codec includes a non-volatile memory coupled to the programmable processor, wherein the method further comprises the codec receiving program instructions from the HDA bus, the codec storing the program instructions in the non-volatile memory coupled to the programmable processor, and the programmable processor rebooting from the program instructions stored in the non-volatile memory.

17. The method of claim 14, wherein after booting, the programmable processor functions as a Class-D PWM controller.

* * * * *

UNITED STATES PATENT AND TRADEMARK OFFICE
CERTIFICATE OF CORRECTION

PATENT NO. : 8,082,438 B2
APPLICATION NO. : 12/202359
DATED : December 20, 2011
INVENTOR(S) : Chieng et al.

It is certified that error appears in the above-identified patent and that said Letters Patent is hereby corrected as shown below:

In Claim 14, at Column 12, Line 17, replace "be" with --byte--.

Signed and Sealed this
Fifteenth Day of May, 2012

David J. Kappos
*Director of the United States Patent and Trademark Office*